May 28, 1929. B. J. GOLDSMITH ET AL 1,714,980
VEHICLE BODY
Filed Oct. 23, 1925
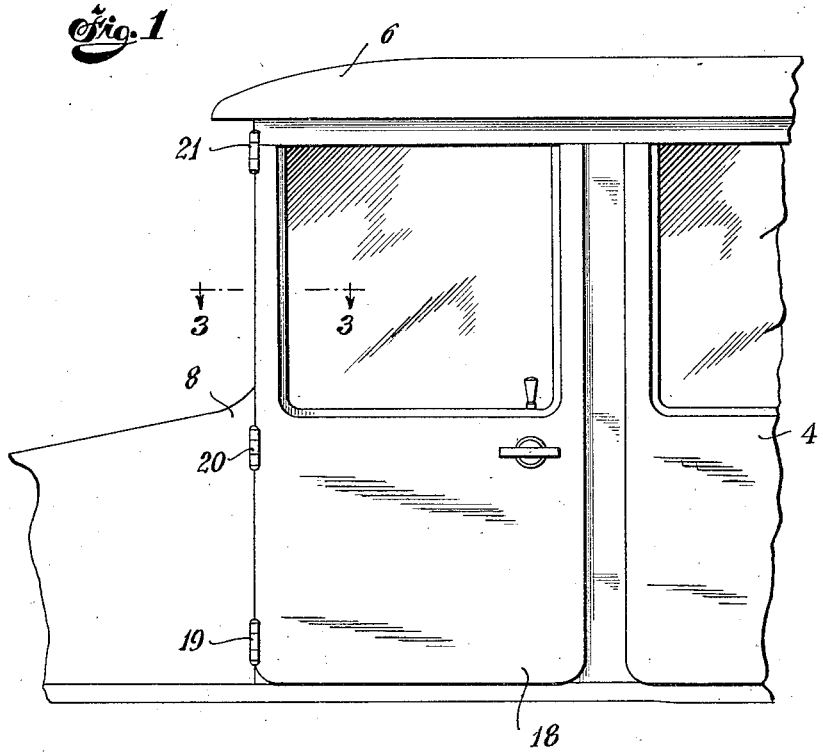
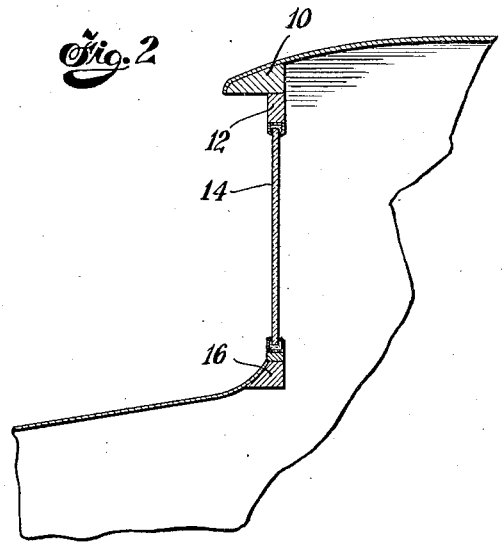
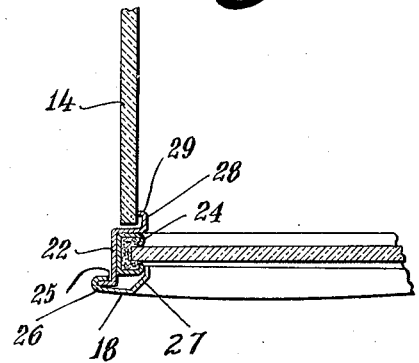
Inventors
Bertram J. Goldsmith
Emil Koeb.
By their Attorneys
Townsend & Decker.

Patented May 28, 1929.

1,714,980

UNITED STATES PATENT OFFICE.

BERTRAM J. GOLDSMITH AND EMIL KOEB, OF NEW YORK, N. Y., ASSIGNORS, BY MESNE ASSIGNMENTS, TO THE ENGLISH & MERSICK COMPANY, OF NEW HAVEN, CONNECTICUT, A CORPORATION OF CONNECTICUT.

VEHICLE BODY.

Application filed October 23, 1925. Serial No. 64,305.

This invention relates to improvements in vehicle constructions.

It is one of the primary objects of the invention to reduce the thickness of the non-transparent portion of the vehicle framework at the sides of the windshield thereby allowing the operator of the vehicle a better view of the roadway and reducing the so-called "blind-spot".

It is another object to provide a construction which will afford a brace for the top and windshield of the vehicle through separate instrumentalities such for example as the automobile door so that if desired the sides of the windshield may be exposed without the usual side supporting framework.

It is still another object to provide engaging elements for supporting the side edges of the windshield when the vehicle door is closed to prevent vibration of the same and to exclude the elements from the interior of the vehicle.

Other and more specific objects relate to the particular construction of the side channel of the door whereby to afford maximum strength with a minimum of obstruction to the view of the operator of the vehicle and other features of construction hereinafter described and claimed.

In the drawings,

Fig. 1 is a side elevational view of a portion of a closed vehicle showing our invention applied thereto.

Fig. 2 is a sectional view thereof.

Fig. 3 is a horizontal section taken on the line 3—3 of Fig 1.

Referring to the details of the drawing, there is disclosed a vehicle body indicated generally at 4 and including the vehicle top 6 and the cowl 8. The front portion of the top is braced by means of a cross-brace member 10 to which is secured, according to the construction shown, the cross-brace member 12 supporting the upper portion of the windshield 14 and reinforcing the top frame structure. The lower edge of the windshield is supported on the cross-brace 16, the members 12 and 16 being provided with suitable padded channels or other devices for securing and protecting the edges of the windshield. As shown, the transparent windshield 14 is exposed and entirely unsupported at the side edges thereof so as to allow maximum visibility from the interior of the vehicle.

In closed vehicles the bodies thereof are usually sufficiently rigid to permit of supporting the windshield at the upper and lower edges thereof only but in order to further insure adequate support for the vehicle top and windshield the door constructed and mounted as described below is preferably employed.

The front vehicle door 18, according to the preferred construction, is hinged at the forward edge thereof as indicated at 19, 20 and 21. The hinges 19 and 20 are supported by the body of the vehicle and are spaced so as to securely support the door from the body of the vehicle. The upper hinge 21 is secured to the cross-brace 12 or other part of the top framework at the upper portion of the windshield, the door thereby serving as a connection between the body and top of the vehicle adjacent the sides of the windshield.

In order to provide the least obstruction possible commensurate with the degree of strength required the side members 22 of the door at the hinged edge thereof are formed with a body portion angularly arranged to support the window channel or other guide 24. The side member is further strengthened by means of the outer flange 25 which serves as a securing element for the outer panel or covering 26 of the door and with an inner projection 28 having an extension 29 positioned to engage the side edge of the windshield when the door is in closed position. It is to be noted that the projections 25 and 28 while they materially strengthen the side member 22 do not obstruct the view of the operator of the vehicle since both flanges project into alignment with the angular body portion of the side members as viewed from the operator's seat. It will be understood that if desired the extension 29 may be suitably padded where it contacts with the windshield 14 to prevent injury to the windshield and to avoid any noise between these parts. The outer panel 26 which extends from the flange 25 to a position adjacent the window guide 24 is preferably arranged at an angle substantially in line with the vision of the operator of the vehicle as shown at 27 in Fig. 3 in order to further reduce the obstruction to the vision of the operator.

It will be seen that according to the above-described construction we provide a body and windshield construction in which the parts are adequately braced with respect to one another with a particular door construction affording maximum strength therein and at the same time reducing the "blind-spot" by narrowing the non-transparent portion of the frame adjacent the side edge of the windshield. The door serves as a brace and connection between the top and body of the vehicle and also serves to support the side edges of the windshield and exclude the elements from the interior of the vehicle.

While we have shown and described certain specific constructions it is to be understood that these are merely illustrative of the invention the scope of which is set forth in the appended claim.

We claim as our invention:

In a vehicle including a body and a top connected at one portion thereof by a transparent windshield, a door formed with a vertical side member, means for hingedly securing the forward edge of said door to said body and top with said side member positioned adjacent the side edge of said windshield, said windshield and the side member of said door constituting the entire connection between body and top adjacent the side edge of said windshield.

Signed at New York in the county of New York and State of New York this 22nd day of October, A. D. 1925.

EMIL KOEB.
BERTRAM J. GOLDSMITH.